United States Patent Office 3,652,709
Patented Mar. 28, 1972

---

3,652,709
HYDROISOMERIZATION IN THE PRESENCE OF CARBON OXIDE PROMOTED CATALYST
Joseph A. Durkin, Fishkill, John H. Estes, Wappingers Falls, and William L. Lafferty, Jr., Fishkill, N.Y., assignors to Texaco Inc., New York, N.Y.
No Drawing. Filed June 16, 1970, Ser. No. 46,803
Int. Cl. C07c 5/28
U.S. Cl. 260—683.68                      14 Claims

ABSTRACT OF THE DISCLOSURE

A method for the hydroisomerization of $C_4$–$C_7$ hydrocarbons in the presence of a chloride activated metal-alumina catalyst, where the metal is selected from the group consisting of ruthenium, rhodium, palladium and platinum, where the selectivity of the catalyst is enhanced by treating the catalyst with a carbon oxide at a temperature within the range of about 50° F. to 400° F.

BACKGROUND OF THE INVENTION

This invention relates to a hydrocarbon conversion process and more particularly to a process and catalyst for the isomerization of isomerizable hydrocarbons. In accordance with this invention, hydroisomerization of $C_4$–$C_7$ hydrocarbons is conducted in the presence of a chlorided metal-alumina catalyst wherein the catalyst is treated with a carbon oxide such that the catalyst is characterized by high activity and selectivity. By selectivity we mean the ability of the catalyst during the isomerization of isomerizable hydrocarbons to adjust the octane number upward by converting, for example, normal paraffins to isoparaffins.

Highly active isomerization catalysts prepared by the activation of a metal-alumina composite with an organic chloride activating agent or combination of agents are described in application Ser. No. 419,755, filed Dec. 21, 1964, which issued as U.S. Pat. 3,551,516; Ser. No. 810,031, filed Mar. 24, 1969, which issued as U.S. Pat. 3,555,107 and Ser. No. 812,914, filed Apr. 2,1969, which issued as U.S. Pat. 3,567,796, all assigned to the assignee hereof. According to these disclosures, catalysts are prepared by chloriding composites of metal and alumina where the metal is selected from the group consisting of platinum, palladium, rhodium and ruthenium, by treatment with an organic chloride activating agent, for example, a chloroalkane or an acid chloride or other chloriding systems under conditions effective to react at least a portion of said activating agent with at least one component of said metal-alumina composite such that the composite is provided with a chlorine content of about 3.0 to 15.0 weight perecnt. The chlorided metal-alumina catalyst can thereafter be stabilized in accordance with the procedures described in U.S. Pats. 3,440,300 and 3,440,301.

The catalysts described above are employed to isomerize paraffins in the $C_4$–$C_7$ range. Isomerization of these hydrocarbons permits the petroleum refiner to upgrade such hydrocarbons to valuable gasoline components. For example, isomerization enables the refiner to upwardly adjust the octane number of the fraction by converting the normal paraffins such as normal hexanes to isoparaffins such as 2,2-dimethylbutane. A blend of various isomeric paraffins provides a gasoline which has a higher octane number than a gasoline consisting of normal paraffins. Isomerization is generally performed by introducing the isomerizable hydrocarbon together with hydrogen through a reaction zone containing the isomerization catalyst. Hydrogen to hydrocarbon mol ratios of from 0.05:1 to 5.0:1, preferably within the range of about 0.5:1 to 2:1 for pentanes and hexanes and 0.1:1 to 1:1 for butane are employed. Reaction temperatures within the range of 200 to 400° F. are appropriate and hydrocarbon streams consisting chiefly of pentanes and hexanes are isomerized at temperatures within the range of about 250 to 350° F. and preferably within the range of 280 to 330° F. Butane isomerization is effected at temperatures within the range of about 300 to 400° F. and preferably within the range of 315 to 350° F. The isomerization normally effected under hydrogen pressure may be carried out in the liquid or vapor phase. Generally, pressures within the range of 300 to 700 p.s.i.g. have been found to be appropriate. A liquid hourly space velocity, i.e., the volume of liquid charge per hour per volume of catalyst within the range of about 0.5 to 10.0 and preferably within the range of about 0.75 to 4.0 is employed.

SUMMARY OF THE INVENTION

In accordance with the process of this invention, the isomerization activity and selectivity of the chloride activated metal-alumina catalyst is enhanced by contacting the catalyst at a temperature of from about 50 to 400° F. with a carbon oxide selected from the group consisting of carbon monoxide and carbon dioxide. The promotional effects provided to the catalyst by such a treatment was unexpected inasmuch as carbon oxide such as carbon monoxide had long been considered as strong general poisons towards noble metal catalysts and particularly platinum catalysts. Notwithstanding these known deleterious effects of carbon monoxide, isomerization performed in the presence of a carbon oxide treated chlorided metal alumina catalyst resulted in improved selectivity towards high octane number blending components.

As mentioned above, the instant invention provides an isomerization process having greater selectivity towards high octane blending components. The alumina contemplated as a component of the chloride activated metal-alumina catalyst and suitable for use in the isomerization process may be any of the conventionally employed aluminas, as for example, eta-alumina, gamma-alumina, thoria-alumina, zirconia-alumina, titania-alumina and chromia-alumina. Preferably eta- and gamma-alumina having surface areas of from about 100 to 450 square meters per gram are employed. In general, the alumina is initially calcined at temperatures of from 800 to 1200° F. for periods of at least two hours. The metal-alumina composites are prepared by techniques well known to the art. Illustratively, a metal such as platinum is provided to the composite by impregnating active alumina with an aqueous solution of chloroplatinic acid and ethylene diamine followed by drying and calcining at about 1050° F. for two hours thereby providing a platinized alumina composite. Where palladium is contemplated, it may similarly be introduced by providing a palladium tetramine complex as by dissolving palladium chloride in hydrochloric acid, diluting with water and concentrated ammonium hydroxide followed by heating at 140° F. with stirring for about 30 minutes until the precipitate originally formed is dissolved. The resulting solution is cooled and added to the alumina and after thorough mixing the alumina is dried at about 300° F. and thereafter calcined at elevated temperatures of from 800 to 1200° F. for periods of at least two hours. In a similar manner rhodium and ruthenium are provided to the composite by impregnation with soluble salts of these metals followed by calcination at 600 to 1200° F. for several hours. In general, the metal is present in an amount of from about 0.01 to 5.0, preferably 0.1 to 2.0 weight percent based on the weight of the final catalyst.

Subsequently, the metal-alumina composite is contacted with an activator system using a chlorinated hydrocarbon such as carbon tetrachloride or an organic chloride having at least two carbon atoms together with chlorine or oxygen, thereby providing the activated catalytic material with from 3.0 to 15.0 weight percent chlorine. The chlorided metal-alumina catalyst may thereafter be stabilized by heating the catalyst to a temperature of from 600 to 1200° F. in a gaseous stream inert to the system such as hydrogen, nitrogen, helium, oxygen or argon and thereafter contacting the catalyst with hydrogen chloride gas or a chlorinated hydrocarbon such as carbon tetrachloride at a temperature of from about 150 to 700° F.

The chloride activated metal-alumina catalyst, preferably stabilized in the manner described above, is promoted and its selectivity improved by the steps of heating the catalyst to a temperature of about 50 to 400° F. in the presence of a carbon oxide selected from the group carbon monoxide and carbon dioxide. Suitably, atmospheric pressures are employed but higher pressures up to about 700 p.s.i.g. can be utilized. The ratio of carbon oxide to catalyst during the contacting stage can vary from 1.0 to 10.0 pound moles of carbon oxide per pound of catalyst. Contacting of the catalyst with the carbon oxide can be undertaken in a pressurized reactor or the carbon oxide may be permitted to flow through and around the catalyst at flow rates sufficient to insure that the catalyst is contacted with from 1.0 to 10.0 pound moles of carbon oxide per pound of catalyst. Contact times of from one-half to four hours are contemplated as providing the beneficial effects described herein.

In a particularly desirable embodiment, the catalyst is dynamically promoted in an isomerization reactor or chamber with a carbon oxide by heating the chlorided metal-alumina catalyst to a temperature of from about 50 to 400° F. and preferably 250 to 350° F. while the carbon oxide at atmospheric pressure is passed through the catalyst such that the catalyst is contacted with from 2.6 to 5.2 pound moles of carbon oxide per pound of catalyst over a period of from 1 to 3 hours. Thereafter, the catalyst is cooled to room temperature in the presence of a non-reactive gas such as nitrogen which does not substantially react with the catalyst or have a deleterious effect thereon. Other non-reactive gases include helium or argon.

In the manner provided above, wherein the chlorided metal-alumina catalyst is treated with the carbon oxide, there is provided to the catalyst from $0.3 \times 10^{-5}$ to $5.0 \times 10^{-5}$ moles of desorbable gaseous carbon oxide over a temperature interval of from 75 to 800° F. per gram of catalyst. Amounts less than $0.3 \times 10^{-5}$ moles of desorbable carbon oxide are insufficient to provide the beneficial effects of improved selectivity in isomerization reactions and amounts exceeding $5.0 \times 10^{-5}$ moles of desorbable carbon oxide are toxic to the catalyst.

One method for determining the desorbable moles of gaseous carbon oxide per gram of catalyst in the range set forth above involves providing an apparatus consisting of a one inch by six inch glass tube surrounded by a furnace and a glass manifold through which the desorbed gases flow to a liquid nitrogen cooled receiver. A constant volume bulb to which the condensed gases desorbed can be expanded is also included along with a gage to measure the pressure of the expanded gases and a second receiver which serves as a sample tube for the gases desorbed. The temperature of the catalyst is regulated by a thermocouple located in the center of the catalyst containing portion of the sample tube. At the neck of the desorption tube and just outside the furnace, a water cooled condenser is provided to cool the desorbed gases. In operation, the desorption tube containing the catalyst is weighed carefully and then inserted in the tube furnace which is at room temperature. The sample tube is connected to the glass manifold which is fitted at its restricted external outlet with a small water condensor. As the gases are desorbed, they are collected in a liquid nitrogen cooled receiver. The catalyst tube is closed off and the condensed desorbate in the receiver is expanded into the constant volume bulb at which time its pressure is measured. During this time, the temperature of the furnace is being raised in preparation for obtaining the next desorbate fraction. From the pressure and volume measurement, the number of moles of gas desorbed is calculated assuming ideal gas behavior. The expanded gas is recondensed in the second receiver and the system is now ready for the next desorbate fraction. Desorption is conducted over two temperature intervals, namely, 75–500° F. and 500–800° F. with the time lapse over each temperature interval being 90 minutes.

Within the ranges outlined above, the carbon oxide promoted chloride metal-alumina catalysts have high activity and selectivity for the isomerization of isomerizable hydrocarbons, for example, paraffin hydrocarbons as butane, pentanes, hexanes, and heptanes and naphthenic hydrocarbons such as methylcyclopentane, cyclohexane and dimethylcyclopentane. As contemplated herein the inventive concept includes both initial contacting of freshly prepared and activated chlorided metal-alumina catalysts and subsequent contacting of regenerated chlorided metal-alumina catalysts.

In order to more fully illustrate the nature of our invention and manner of practicing the same, the following examples are presented. In these examples, the best mode contemplated by us for carrying out our invention is set forth.

EXAMPLE I 2000 cc. of a composite composed of 0.6 weight percent platinum on eta-alumina was distributed in a bed 5.7 feet in height and 1.5 inches in diameter with a ¼ inch diameter thermal well mounted concentrically therein. The bed was maintained at a temperature of 475° F. and 1 atmosphere of pressure. 90 pounds of air per hour per square foot of reactor cross-section were passed through the bed together with 10.3 cc. of carbon tetrachloride per 100 cc. of the platinum-alumina composite for 9.75 hours.

The chlorided platinum-alumina catalyst activated above was stabilized by heating for two hours at a temperature of 800° F. while passing hydrogen gas through the catalyst at the rate of 6.31 pounds per hour per square foot of reactor cross-section at atmospheric pressure. The temperature was subsequently decreased to 500° F. and the catalyst was treated with 3 cc. of carbon tetrachloride per 100 cc. of catalyst while air was introduced through the catalyst at the rate of 90 pounds per hour per square foot of reactor cross-section at atmospheric pressure for four hours. While maintaining the temperature of 500° F. one volume of hydrogen chloride per 100 volumes of catalyst and 6.3 pounds of hydrogen per hour per square foot of reactor cross-section were introduced to the catalyst over a period of 7 hours. Thereafter, the temperature was decreased to 335° F. and 1 volume of hydrogen chloride per 100 volumes of catalyst along with 6.3 pounds of hydrogen per hour per square foot of reactor cross-section were introduced over a period of 3 hours. The stabilized catalyst contained a chlorine content of 10.4 weight percent and sampling of the desorbed gases collected after heating the catalyst to a temperature of 800° F. employing the desorption apparatus and methods hereinabove described resulted in the desorption of $0.07 \times 10^{-5}$ moles of carbon monoxide and $0.17 \times 10^{-5}$ moles of carbon dioxide per gram of catalyst.

200 cc. of the above stabilized catalyst was contacted and promoted with carbon monoxide flowing through the catalyst bed at the rate of 1 cubic foot per hour for 2 hours at a temperature of 335° F. After heating a sample of the promoted catalyst to 800° F. in a desorption apparatus, the analysis of desorbed gases showed $1.48 \times 10^{-5}$ moles of carbon monoxide and $0.72 \times 10^{-5}$ moles of carbon dioxide per gram of catalyst.

Another 200 cc. portion of the stabilized catalyst was contacted over a period of 2 hours with carbon dioxide introduced at the rate of 1 cubic foot per hour at a temperature of 335° F. Analysis of the desorbed gases collected after heating the catalyst to 800° F. showed desorption of $0.08 \times 10^{-5}$ moles of carbon monoxide and $0.40 \times 10^{-5}$ of carbon dioxide per gram of catalyst.

The catalyst so prepared in the stabilized carbon monoxide promoted and carbon dioxide promoted forms were evaluated for n-hexane isomerization at 300° F., 500 p.s.i.g., a hydrogen to hydrocarbon mol ratio of 2:1 and a liquid hourly space velocity of 1.0. Conversion was also undertaken at a temperature of 275° F. Table I below summarizes the data resulting from the isomerization of n-hexane. The activity of the catalyst was determined by averaging the amount of isomer in the product taken every 2 hours between the fifth and fifteenth hours on stream at 350° F. The activity data at 275° F. was obtained by averaging the results of 5 product samples taken at consecutive 2-hour intervals.

TABLE I.—ISOMER DISTRIBUTION

| Catalyst | Temperature, °F. | n-Hexane | 3-methyl-pentane | 2-methyl-pentane, 2,3-dimethyl-butane | 2,2-dimethyl-butane |
|---|---|---|---|---|---|
| Unpromoted | 300 | 11.1 | 17.5 | 39.1 | 32.1 |
|  | 275 | 9.6 | 16.3 | 39.6 | 34.4 |
| CO promoted | 300 | 8.7 | 16.8 | 41.2 | 33.1 |
|  | 275 | 7.4 | 15.6 | 41.6 | 35.3 |
| CO₂ promoted | 300 | 11.3 | 16.8 | 38.6 | 33.1 |
|  | 275 | 9.0 | 16.1 | 39.6 | 35.2 |

The results shown in Table I point out the beneficial effects of isomerization conducted in the presence of a catalyst treated with the oxides of carbon. From the table it is seen that the high octane number blending component 2,2-dimethylbutane is provided in substantially increased quantities when catalysts promoted with the carbon oxide are employed.

EXAMPLE II

The platinum-alumina composite activated in accordance with Example I was stabilized by heating for 2 hours at a temperature of 800° F. 2000 cc. of catalyst while hydrogen gas was introduced to the catalyst at the rate of 6.31 pounds per hour per square foot of reactor cross-section at atmospheric pressure for 10.8 hours. The temperature was decreased to 500° F., air was admitted to the catalyst at the rate of 90 pounds per hour per square foot of reactor cross-section and 1 volume of hydrogen chloride per 100 volumes of catalyst was introduced along with 6.3 pounds of hydrogen per hour per square foot of reactor cross-section for 7 hours at 500° F. and thereafter for 3 hours at 335° F. The stabilized catalyst contained a chlorine content of 8.7 weight percent and analysis of the desorbed gases from the treatment of the catalyst at 800° F. showed $0.08 \times 10^{-5}$ moles of carbon monoxide and $0.07 \times 10^{-5}$ moles of carbon dioxide per gram of catalyst.

A 200 cc. portion of the above stabilized catalyst was contacted and promoted with carbon dioxide flowing through the catalyst bed at the rate of 1 cubic foot per hour for 2 hours at a temperature of 335° F. The catalyst was cooled to room temperature in a stream of nitrogen. The carbon dioxide promoted catalyst was determined to have a carbon monoxide content of $0.10 \times 10^{-5}$ and a carbon dioxide content of $0.24 \times 10^{-5}$ moles per gram of catalyst as determined by analysis of desorbed gases after heating the catalyst to 800° F. The stabilized and carbon dioxide promoted catalysts were evaluated for n-hexane isomerization as in Example I and Table II summarizes the results.

TABLE II.—EVALUATION
[Isomer distribution]

| Catalyst | Temperature, °F. | n-Hexane | 3-methyl-pentane | 2-methyl-pentane, 2,3-dimethyl-butane | 2,2-dimethyl-butane |
|---|---|---|---|---|---|
| Unpromoted | 300 | 9.4 | 16.6 | 40.9 | 33.0 |
|  | 275 | 8.8 | 16.4 | 41.5 | 33.2 |
| CO₂ promoted | 300 | 8.6 | 16.0 | 41.0 | 34.4 |
|  | 275 | 7.1 | 15.2 | 41.3 | 36.3 |

From the foregoing it is seen that we have provided a significantly useful process for the low temperature isomerization of $C_4$–$C_7$ hydrocarbons wherein increased yields of branch chain isomers representing high octane number blending components are provided. The improved isomerization results reflected in the selectivity to branch chained isomers is attributable to the treatment of the chloride activated metal-alumina catalysts by contacting the same with a carbon oxide of the group carbon monoxide and carbon dioxide. In addition to the specific paraffinic hydrocarbons exemplified above, other naphthenic and paraffinic hydrocarbons having from 4 to 7 carbon atoms can be isomerized by our process with similar beneficial effects.

We claim:

1. In the hydroisomerization of a $C_4$–$C_7$ isomerizable hydrocarbon at a temperature of from 200 to 400° F. wherein said hydrocarbon and hydrogen are contacted with a chlorided metal-alumina catalyst wherein the metal of said catalyst is selected from the group consisting of platinum, palladium, rhodium and ruthenium, said catalyst having a chlorine content of 3.0 to 15.0 weight percent, the method of improving the selectivity of said catalyst which comprises contacting said catalyst at a temperature of from 50 to 400° F. with from about 1.0 to 10.0 pound moles of a carbon oxide per pound of catalyst wherein said carbon oxide is selected from the group consisting of carbon monoxide and carbon dioxide.

2. The method of claim 1 wherein said carbon oxide is carbon monoxide.

3. The method of claim 1 wherein said carbon oxide is carbon dioxide.

4. The method of claim 1 wherein said catalyst is contacted with 2.6 to 5.2 pound moles of carbon oxide per pound of catalyst.

5. The method of claim 1 wherein said contacting is conducted at a temperature of from about 250 to 350° F.

6. The method of claim 1 wherein said catalyst is provided with $0.3 \times 10^{-5}$ to $5.0 \times 10^{-5}$ moles of desorbable carbon oxide per gram of catalyst at a temperature of 75 to 800° F.

7. The method of claim 1 wherein the metal of said catalyst is platinum.

8. A method for improving the selectivity of a chlorided metal-alumina catalyst wherein the metal of said catalyst is selected from the group consisting of platinum, palladium, rhodium and ruthenium, said catalyst having a chlorine content of from 3.0 to 15.0 weight percent, said method comprising contacting said catalyst at a temperature of from 50 to 400° F. with from about 1.0 to 10.0 pound moles of a carbon oxide per pound of catalyst wherein said carbon oxide is selected from the group consisting of carbon monoxide and carbon dioxide.

9. A method according to claim 8 wherein said carbon oxide is carbon monoxide.

10. A method according to claim 8 wherein said carbon oxide is carbon dioxide.

11. A method according to claim 8 wherein said catalyst is contacted with 2.6 to 5.2 pound moles of carbon oxide per pound of catalyst.

12. A method according to claim 8 wherein said contacting is conducted at a temperature of from about 250 to 350° F.

13. A method according to claim 8 wherein said catalyst is provided with $0.3 \times 10^{-5}$ to $5.0 \times 10^{-5}$ moles of desorbable carbon oxide per gram of catalyst at a temperature of 75 to 800° F.

14. A method according to claim 8 wherein the metal of said catalyst is platinum.

References Cited

UNITED STATES PATENTS

| 3,242,228 | 3/1966 | Riordan et al. | 260—683.68 |
| 3,242,229 | 3/1966 | Estes | 260—683.68 |
| 3,419,503 | 12/1968 | Giannetti et al. | 260—683.68 |
| 3,518,207 | 6/1970 | Hagy et al. | 252—466 PT |
| 3,551,516 | 12/1970 | Ashley et al. | 260—683.68 |
| 3,553,281 | 1/1971 | Goble et al. | 260—683.68 |
| 3,567,796 | 3/1971 | Estes et al. | 260—683.68 |

DELBERT E. GANTZ, Primary Examiner

G. J. CRASANAKIS, Assistant Examiner

U.S. Cl.X.R.

252—441